United States Patent Office 3,036,985
Patented May 29, 1962

3,036,985
COMPOSITION COMPRISING A SILOXANE COPOLYMER
William H. Daudt, Midland, Mich., assignor to Dow Corning Corporation, Midland, Mich., a corporation of Michigan
No Drawing. Filed Oct. 6, 1954, Ser. No. 460,770
9 Claims. (Cl. 260—42)

This invention relates to transparent organopolysiloxane elastomers and to the fillers employed therein.

Various types of silica fillers and modified silica fillers have been employed in organopolysiloxane rubbers. The use of silica fillers has given rubbers of varying degrees of strength. In general naturally occurring silica such as diatomaceous earth or powdered quartz give rubbers of relatively low stress-strain properties, i.e., rubbers having efficiencies of less than 100. This is likewise true of unmodified silicas which are prepared by evaporating the solvent from hydrogels or organogels at a temperature below the critical temperature of the solvent. Such silicas are known in the art as xerogels.

Superior stress-strain properties are generally obtained by employing extremely finely divided silicas. These are generally of three classes: silicas prepared by removing the solvent from an organogel at a temperature above the critical pressure of the solvent which are known as aerogels; silicas prepared by burning volatile silanes such as trichlorosilane, ethyl silicate, or silicon tetrachloride which are generally known as fume silicas and modified xerogels such as those disclosed in the copending application of Leslie J. Tyler, Serial No. 460,773, filed October 6, 1954. Of these latter 3 types the modified xerogels give superior elastomers with respect to stress-strain properties.

It is known that fume silicas and silica aerogels can be modified with organosilicon compounds in a variety of ways. These include treating of a fume silica with hydrolyzable silanes as is disclosed in U.S. Patent No. 2,610,167 and the modification of silica aerogels by incorporating limited amounts of monoorganosiloxane salts in a sodium silicate solution and thereafter preparing a cogel by the aerogel technique as is set forth in U.S. Patent 2,441,422. None of the above silicas whether modified or unmodified, with the exception of certain modified xerogels hereinafter defined, give transparent elastomers when incorporated in organosiloxane polymers and thereafter vulcanized.

Applicant has found most unexpectedly that the specific fillers hereinafter defined do give optically clear materials.

It is the object of this invention to produce novel compositions of matter which when incorporated in methyl polysiloxanes give elastomers having a high degree of optical clarity. It is a further object of this invention to provide elastomeric materials suitable for making optically clear safety glass. Another object is to provide elastomeric materials which possess a high degree of optical clarity without undue sacrifice of desirable stress-strain properties. Other objects and advantages will be apparent from the following description.

This invention relates to a composition of matter in a finely divided state having a pore volume of at least 3 cc. per gram, said composition being a copolymer of (A) from 1 to 50 mol percent siloxane units of the formula $RSiO_{3/2}$ in which R is an aliphatic hydrocarbon radical of less than 5 carbon atoms, (B) from 4 to 30 mol percent siloxane units of the formula $$(CH_3)_nSiO_{\frac{4-n}{2}}$$

in which $n$ is an integer from 2 to 3 inclusive and (C) from 46 to 95 mol percent $SiO_2$ units.

For the purpose of this invention the beneficial properties of the compositions claimed herein are not realized when any of the above critical limitations are exceeded. Thus the combination of optical clarity and good stress-strain properties is imparted to silicone rubber by these materials only when the proportions of the various polymer units are within the ranges specified. Furthermore, this combination of properties is imparted only when the material is in a finely divided state, i.e., having pore volume of at least 3 cc. per gram. The pore volume of these materials is determined in accordance with the method described in U.S. Patent 2,541,137 except that octamethylcyclotetrasiloxane is employed in the place of water. When the compositions of this invention are solvent free they are fluffy, light powders having bulk densities of the order of .05 to 1.1 g. per cc.

In the monoorganosiloxane units (A) of the fillers of this invention R can be any aliphatic hydrocarbon radical of less than 5 carbon atoms such as methyl, ethyl, propyl, butyl, vinyl and allyl radicals. The siloxane units (B) are all methylsiloxane units in which there are 2 or 3 methyl groups attached to each silicon atom. For the purpose of this invention it is possible to use a combination of dimethyl and trimethylsiloxane units provided the total mols of the dimethyl and trimethylsiloxane units are not less than 4 mol percent nor more than 30 mol percent of the total composition.

The compositions of this invention may be prepared in any suitable manner. The best method is that described in the copending application of Leslie J. Tyler aforementioned. Briefly this method comprises preparing a silica cohydrogel composed of $RSiO_{3/2}$ and $SiO_2$ units where R is as above defined. Such cogels may be prepared by acidifying an aqueous solution of a mixture of sodium silicate and the desired monoorganosiloxane salt, for example, MeSiO(ONa). The cohydrogel may then be reacted with dimethylsiloxane or hexamethyldisiloxane or copolymers and mixtures thereof in the presence of an acid catalyst whereupon the dimethyl and/or trimethylsiloxane units copolymerize with the cogel.

A modification of this method involves replacing the water in the cohydrogel with an organic solvent such as toluene, methylene chloride and the like and then reacting the resulting organogel with dimethyldichlorosilane, trimethylmonochlorosilane or the corresponding alkoxy silanes or combinations thereof. The solvent is then evaporated to give the compositions of this invention.

This invention further relates to transparent elastomeric compositions which consist essentially of (1) an organopolysiloxane in which at least 50 mol percent of the polymer units are dimethylsiloxane units, any remaining siloxane units being of the formula $$R'_nSiO_{\frac{4-n}{2}}$$

in which $R'$ is a monovalent hydrocarbon radical of less than 10 carbon atoms and $n$ has an average value from 1.9 to 2.1 inclusive and (2) a filler having a pore volume of at least 3 cc. per gram which is composed of a copolymer of (A) from 1 to 50 mol percent $RSiO_{3/2}$ units in which R is an aliphatic hydrocarbon radical of less than 5 carbon atoms, (B) from 4 to 30 mol percent $$(CH_3)_nSiO_{\frac{4-n}{2}}$$

units in which $n$ is an integer from 2 to 3 inclusive and (C) from 46 to 95 mol percent $SiO_2$ units.

The proportion of filler in the elastomers of this invention is not critical although preferably the amount of filler should range from 5 to 50 parts by weight based on 100 parts by weight of the polymer. These ranges give elastomers of superior stress-strain properties.

The viscosity of the polysiloxane is not critical. They may range from thin fluids to nonflowing gels. Preferably, the polymers are diorganopolysiloxanes having viscosities of at least 5,000 cs. at 25° C.

The polymers (1) employed in the elastomers of this invention can be dimethylpolysiloxanes or copolymers of dimethylpolysiloxane with limited amount of monomethyl and/or trimethylsiloxane units. In addition the polysiloxane may be copolymers of dimethylpolysiloxane with other monovalent hydrocarbon substituted siloxanes. Specific examples of such siloxanes are phenylmethylsiloxane, diphenylsiloxane, ethylmethylsiloxane, methylvinylsiloxane, allylbutylsiloxane, cyclohexyltolylsiloxane, cyclohexenylbenzylsiloxane and octylmethylsiloxane. In all cases the amount of dimethylsiloxane units should be at least 50 mol percent of the total polymer. It should be understood that the polymer may contain limited amounts of monoorganosiloxane units and/or triorganosiloxane units in which the organic radicals are other than methyl.

The elastomers of this invention are prepared by mixing the polymer, filler and any desired vulcanizing agent in any suitable fashion and thereafter vulcanizing the compounded material. For the purpose of this invention any vulcanizing agent for organosiloxane elastomers can be employed. For example, the compositions may be vulcanized by heating them with organic peroxides such as benzoyl peroxide, t-butylperbenzoate, halogenated benzoyl peroxides and the like. Or the compounds of this invention may be vulcanized by incorporating therein limited amounts, say from .5 to 5 parts by weight based on 100 parts by weight of the polymer of polyalkoxysilicates or hydrogen-containing siloxanes such as methylhydrogen polysiloxane together with suitable catalysts such as lead octoate or dibutyl-tin-diacetate or other salts of carboxylic acids and then allowing the mixture to stand at room temperature. If desired, the compositions of this invention may be vulcanized by heating alone although the presence of a vulcanizing agent is preferable.

The compositions of this invention may also contain limited amounts of stabilizers, compression set additives, oxidation inhibitors and other special additives normally employed in siloxane rubbers.

The elastomers of this invention are particularly useful in the manufacture of articles wherein optical clarity is desirable. For example, they are useful as interlayers in safety glass, in the preparation of pharmaceutical equipment and in the preparation of volumetric apparatus. The fillers of this invention in addition to their use in silicone rubbers are useful as flatting agents in paints and as fillers in life preservers and in other uses where hydrophobic finely divided materials are needed.

The following examples are illustrative only and should not be construed as limiting the invention which is properly delineated in the appended claims. All of the fillers in the following examples had pore volumes of at least 3 cc. per g.

*Example 1*

306 ml. of a cohydrogel containing 30 g. of $SiO_2$ units and 1.8 g. of $C_3H_9SiO_{3/2}$ units, said hydrogel having a density of .05 g. of total solids per ml. was cut into small pieces and stirred 1 hour with 250 ml. of concentrated hydrochloric acid and 350 ml. of isopropanol. 1,000 ml. of hexamethyldisiloxane was then added and the mixture stirred for 1½ hours. An aqueous phase exuded from the gel and was drawn off. The resulting organogel was dried over a steam bath and finally heated 15.5 hours at 110° C. giving a powdery material having a bulk density of .051 g. per cc. The resulting material was a copolymer composed of 75.2 mol percent $SiO_2$ units, 2.8 mol percent $C_3H_9SiO_{3/2}$ units and 22 mol percent $(CH_3)_3SiO_{.5}$ units as indicated by carbon analysis.

*Example 2*

600 ml. of a cohydrogel containing 3 mol percent $CH_3SiO_{3/2}$ units and 97 mol percent $SiO_2$ units and having a density of .078 g. of total solids per ml. was broken into small lumps and stirred with 250 ml. of concentrated HCl and 350 ml. of isopropyl alcohol for 1 hour. 800 ml. of hexamethyldisiloxane was then added and the mixture stirred for 1½ hours. An aqueous phase separated and was removed and the resulting organogel was dried over a steam bath and finally heated 40 hours at 110° C. The product was a powder having a bulk density of .067 g. per cc. and was a copolymer of 75.6 mol percent $SiO_2$ units, 2.4 mol percent $CH_3SiO_{3/2}$ units and 22 mol percent $(CH_3)_3SiO_{.5}$ units.

*Example 3*

657 ml. of a cohydrogel having a density of .071 g. of total solids per ml. and having a composition 80 mol percent $SiO_2$ units and 20 mol percent $CH_3SiO_{3/2}$ units was reacted with 800 ml. of hexamethyldisiloxane in accordance with the method of Example 2. The resulting product had a bulk density of .056 g. per cc. and had the composition 63.6 mol percent $SiO_2$ units, 15.9 mol percent $CH_3SiO_{3/2}$ units and 20.5 mol percent $(CH_3)_3SiO_{.5}$ units.

*Example 4*

888.5 ml. of a cohydrogel having a density of .053 g. of total solids per ml. and having a composition 40 mol percent $CH_2SiO_{3/2}$ units and 60 mol percent $SiO_2$ units was reacted with 1,000 ml. of hexamethyldisiloxane in accordance with the method of Example 2. The resulting product had a bulk density of .058 g. per cc. and had a composition of about 20 mol percent $(CH_3)_3SiO_{.5}$ units, about 31 mol percent $CH_3SiO_{3/2}$ units and about 49 mol percent $SiO_2$ units.

*Example 5*

Elastomers were prepared using each of the fillers of Examples 1 through 4 as follows: 100 parts of a copolymer gum composed of 92.358 mol percent dimethylsiloxane, 7.500 mol percent phenylmethylsiloxane and .142 mol percent methylvinylsiloxane, 30 parts by weight filler, 3 parts by weight ethylpolysilicate and 1 part by weight butyl-tin-tris-2 ethylhexoate were milled until a uniform mass was obtained and then pressed into a sheet and allowed to stand at room temperature for 3 days. Each sheet was then heated 1 hour at 150° C. and 6 hours at 250° C. Each of the resulting elastomers were then tested for physical properties and percent haze as shown in the table below.

| Filler | Tensile in p.s.i. | Percent Elongation at Break | Durometer | Percent Haze [1] |
|---|---|---|---|---|
| Example 1 | 1,010 | 800 | 45 | 2.5 |
| Example 2 | 467 | 530 | 51 | 3.5 |
| Example 3 | 1,095 | 675 | 56 | 3.5 |
| Example 4 | 866 | 880 | 46 | 2.3 |

[1] Percent haze was determined using a spectrophotometer with an ICI illuminant C, in accordance with the method described in U.S. Government Publication, "Federal Specification L-P 406 B," Method No. 3022.

*Example 6*

A filler was prepared from 641 ml. of a cohydrogel having a density of .065 g. of total solids per ml. and having a composition 90 mol percent $SiO_2$ units and 10 mol percent $CH_2=CHSiO_{3/2}$ units was reacted with 1,000 ml. of hexamethyldisiloxane in accordance with the procedure of Example 2. The resulting product had a bulk density of .055 g. per cc. and was a copolymer of about 7.8 mol percent $CH_2=CHSiO_{3/2}$ units, about 21 mol percent $(CH_3)_3SiO_{.5}$ units and about 71.2 mol percent $SiO_2$ units.

This filler was incorporated into an elastomer in accordance with the method of Example 5 and the resulting product had a tensile strength of 735 p.s.i., a percent elongation at break of 190, a durometer of 65 and it had good clarity.

*Example 7*

200 ml. of a washed cohydrogel having a density of

.07 g. of total solids per ml. and having a composition of 80 mol percent $SiO_2$ units and 20 mol percent $CH_3SiO_{3/2}$ units was extracted with isopropanol to remove the water and then with toluene to remove the alcohol. The resulting organogel was covered with 200 ml. of additional toluene and 20 ml. of dimethyldichlorosilane were added to the mixture. The material was then allowed to stand for 3 days and extracted with toluene to remove excess dimethyldichlorosilane and by produced HCl. The toluene was then removed by evaporation on a steam bath followed by 16 hours heating at 110° C. The resulting product was a powder having a bulk density of .069 g. per cc. It was composed of a copolymer of about 72 mol percent $SiO_2$ units, about 16 mol percent $CH_3SiO_{3/2}$ units and about 12 mol percent $(CH_3)_2SiO$ units.

30 parts of this filler was incorporated into an elastomer in accordance with the method of Example 5. The resulting elastomer after standing 3 days at room temperature followed thereby by heating 24 hours at 50° C. had a tensile strength of 2,000 p.s.i. and elongation at break of 1,100 percent and possessed excellent clarity.

*Example 8*

200 ml. of a coorganogel, in toluene, having a density of .055 g. of total solids per ml. and having the composition 80 mol percent $SiO_2$ units and 20 mol percent $CH_3SiO_{3/2}$ units was diluted with 300 ml. more of toluene and then 2 ml. of trimethylchlorosilane were added to the mixture. The product was allowed to stand for 3 days. The solvent was removed by evaporation to give a powder having a bulk density of .11 g. per cc. and was composed of 75 mol percent $SiO_2$ units, 19 mol percent $CH_3SiO_{3/2}$ units and 6 mol percent $(CH_3)_3SiO_{.5}$ units.

30 parts of this filler were incorporated into an elastomer in accordance with the method of Example 5 and the resulting product had a tensile of 631 p.s.i., a percent elongation at break of 375 and possessed excellent clarity.

*Example 9*

30 parts by weight of the filler of Example 3 were milled with 100 parts by weight of a dimethylpolysiloxane gum and 1 part by weight t-butylperbenzoate and thereafter heated 10 minutes at 150° C. The resulting elastomer had a durometer of 33, a tensile strength of 1,025 p.s.i., a percent elongation at break of 1,040 and possessed excellent clarity.

That which is claimed is:

1. As a composition of matter a finely divided solid having a pore volume of at least 3 cc. per g. which is a copolymer composed of (A) from 1 to 50 mol. percent $RSiO_{3/2}$ units in which R is an aliphatic hydrocarbon radical of less than 5 carbon atoms, (B) from 4 to 30 mol percent $$(CH_3)_nSiO_{\frac{4-n}{2}}$$

units in which $n$ is an integer from 2 to 3 inclusive and (C) from 46 to 95 mol percent $SiO_2$ units.

2. As a composition of matter a finely divided solid having a pore volume of at least 3 cc. per g. which is a copolymer composed of from 1 to 50 mol percent $CH_3SiO_{3/2}$ units, from 4 to 30 mol percent $(CH_3)_3SiO_{.5}$ units and from 46 to 95 mol percent $SiO_2$ units.

3. As a composition of matter a finely divided solid having a pore volume of at least 3 cc. per g. which is a copolymer composed of from 1 to 50 mol percent $C_3H_9SiO_{3/2}$ units, from 4 to 30 mol percent $(CH_3)_3SiO_{.5}$ units and from 46 to 95 mol percent $SiO_2$ units.

4. A heat hardenable composition of matter consisting essentially of (1) an organopolysiloxane in which at least 50 mol percent of the polymer units are dimethylsiloxane units, any remaining polymer units being of the formula $$R'_nSiO_{\frac{4-n}{2}}$$

in which R' is a monovalent hydrocarbon radical having less than 10 carbon atoms and $n$ has an average value from 1.9 to 2.1 inclusive, (2) a filler having a pore volume of at least 3 cc. per g. which is composed of a copolymer of (A) from 1 to 50 mol percent $RSiO_{3/2}$ units in which R is an aliphatic hydrocarbon radical of less than 5 carbon atoms, (B) from 4 to 30 mol percent $$(CH_3)_nSiO_{\frac{4-n}{2}}$$

units in which $n$ is an integer from 2 to 3 inclusive and (C) from 46 to 95 mol percent $SiO_2$ units and (3) a vulcanizing agent.

5. A heat hardenable composition of matter consisting essentially of (1) an organopolysiloxane in which at least 50 mol percent of the polymer units are dimethylsiloxane units, any remaining polymer units being of the formula $R'_2SiO$ in which R' is selected from the group consisting of methyl, phenyl and vinyl radicals, (2) a filler having a pore volume of at least 3 cc. per g. which is composed of a copolymer of from 1 to 50 mol percent $CH_3SiO_{3/2}$ units, from 4 to 30 mol percent $(CH_3)_3SiO_{.5}$ units and from 46 to 95 mol percent $SiO_2$ units and (3) a vulcanizing agent.

6. A heat hardenable composition of matter consisting essentially of (1) an organopolysiloxane in which at least 50 mol percent of the polymer units are dimethylsiloxane units, any remaining polymer units being of the formula $R'_2SiO$ in which R' is selected from the group consisting of methyl, phenyl and vinyl radicals, (2) a filler having a pore volume of at least 3 cc. per g. which is composed of a copolymer of from 1 to 50 mol percent $C_3H_9SiO_{3/2}$ units, from 4 to 30 mol percent $(CH_3)_3SiO_{.5}$ units and from 46 to 95 mol percent $SiO_2$ units and (3) a vulcanizing agent.

7. A vulcanized elastomeric composition consisting essentially of (1) an organopolysiloxane in which at least 50 mol percent of the polymer units are dimethylsiloxane units, any remaining polymer units being of the formula $$R'_nSiO_{\frac{4-n}{2}}$$

in which R' is a monovalent hydrocarbon radical of less than 10 carbon atoms and $n$ has an average value of from 1.9 to 2.1 and (2) a filler having a pore volume of at least 3 cc. per g. which is composed of a copolymer of (A) from 1 to 50 mol percent $RSiO_{3/2}$ units in which R is an aliphatic hydrocarbon radical of less than 5 carbon atoms, (B) from 4 to 30 mol percent $$(CH_3)_nSiO_{\frac{4-n}{2}}$$

units in which $n$ is an integer from 2 to 3 inclusive and (C) from 46 to 95 mol percent $SiO_2$ units.

8. A vulcanized elastomeric composition consisting essentially of (1) an organopolysiloxane in which at least 50 mol percent of the polymer units are dimethylsiloxane units, any remaining polymer units being of the formula $R'_2SiO$ in which R' is selected from the group consisting of methyl, phenyl and vinyl radicals and (2) a filler having a pore volume of at least 3 cc. per g. which is composed of a copolymer of from 1 to 50 mol percent $CH_3SiO_{3/2}$ units, from 4 to 30 mol percent $(CH_3)_3SiO_{.5}$ units and from 46 to 95 mol percent $SiO_2$ units.

9. A vulcanized elastomeric composition consisting essentially of (1) an organopolysiloxane in which at least 50 mol percent of the polymer units are dimethylsiloxane units, any remaining polymer units being of the formula $R'_2SiO$ in which $R'$ is selected from the group consisting of methyl, phenyl and vinyl radicals and (2) a filler having a pore volume of at least 3 cc. per g. which is composed of a copolymer of from 1 to 50 mol percent $C_3H_9SiO_{3/2}$ units, from 4 to 30 mol percent $(CH_3)_3SiO_{.5}$ units and from 46 to 95 mol percent $SiO_2$ units.

References Cited in the file of this patent

UNITED STATES PATENTS

| | | |
|---|---|---|
| 2,441,422 | Krieble et al. | May 11, 1948 |
| 2,567,315 | Bidaud et al. | Sept. 11, 1951 |
| 2,568,672 | Warrick | Sept. 18, 1951 |
| 2,610,167 | Te Grotenhuis | Sept. 9, 1952 |
| 2,676,182 | Daudt et al. | Apr. 20, 1954 |

UNITED STATES PATENT OFFICE
CERTIFICATE OF CORRECTION

Patent No. 3,036,985                                                May 29, 1962

William H. Daudt

It is hereby certified that error appears in the above numbered patent requiring correction and that the said Letters Patent should read as corrected below.

Column 4, line 25, for the formula "$CH_2SiO_{3/2}$" read -- $CH_3SiO_{3/2}$ --.

Signed and sealed this 20th day of November 1962.

(SEAL)
Attest:

ERNEST W. SWIDER
Attesting Officer

DAVID L. LADD
Commissioner of Patents